United States Patent Office 3,370,931
Patented Feb. 27, 1968

3,370,931
ALLOY STEEL WELDING WIRES
Willem Pieter van den Blink, Utrecht, Netherlands, assignor to North American Philips Company, Inc.
No Drawing. Filed Apr. 22, 1965, Ser. No. 450,212
Claims priority, application Netherlands, May 22, 1964, 64—5,699
2 Claims. (Cl. 29—191.6)

ABSTRACT OF THE DISCLOSURE

Welding wire having mild steel casing and a filling of about 80% of a non-magnetic metal or alloy of iron, the remainder, preferably about 5%, of a ferromagnetic material.

---

The invention relates to composite, alloy steel welding wire, particularly for use in automatic steel welding, in which the metal is protected during the welding process from the action of air by a gas atmosphere or under a covering of slag forming substance.

Such composite welding wire may, as is known, be obtained by rolling and/or drawing an ingot having a bore filled with a mixture of powdery substances or by folding or wrapping such a mixture in steel tape and subsequently drawing to the desired wire diameter.

The term "alloy steel welding wire" has to be understood to denote here a wire having such a gross composition that during the welding operation an alloy steel is melted down.

In practice there should be available wires of different contents of alloying constituents and of different diameters.

In order to avoid as far as possible the drawback of the manufacture of a great number of alloys of different compositions and the difficulties involved in certain alloys in working up to the desired wire diameter, such welding wire may be composed of a readily workable, tubular casing, for example of mild steel, and a powdery filling containing the alloy constituents as such or in the form of alloys, there being added, if desired, iron powder, slag forming substances and are stabilizers. The desired composition of the alloy to be melted down may then be obtained by the choice of the quantities of alloy constituents in the filling and of the weight ratio between the filling and the casing.

With wires of this kind, in which the gross composition of the metal in the filling does not materially differ from the composition of the casing, local incompleteness of the filling or of the composition thereof, which may be due to incomplete mixing or to separating of the mixture during machining, has little influence on the composition of the metal melted down.

Conditions are different, however, if, as in the alloy steel wires according to the invention, the gross composition of the filling differs considerably from the composition of the casing. In this case local differences in the completeness and the mixture of the filling result in differences in composition of the melted metal which may have a troublesome effect.

Local differences in the gross composition of the wire due to incomplete mixing or to separating of the mixture of the powdery substances of the filling may be counteracted by composing the filling mainly of a single powdery alloy containing in common the desired constituents.

For example, a tubular casing of technically pure iron, filled with an alloy of 40% of chromium, 20% of nickel and otherwise chiefly iron in a weight ratio between the casing and the filling of 1:1 can provide a wire of an average composition corresponding to that of stainless steel of 20% chromium and 10% of nickel.

The above-mentioned second source of potential differences in the composition, i.e., local incompleteness of the filling during the manufacture is, however, maintained.

The invention is based on the recognition of the fact that the wire concerned can be composed so that by a simple magnetic measurement the filling can be continuously checked during the manufacture of the wire.

The welding wire according to the invention consists of casing of mild steel or low alloy steel and a filling a powdery material in which the alloy constituents are contained and is characterised in that the filling consists at least for 80% of a non-magnetic metal or a non-magnetic alloy and for a few percents, preferably about 5% of ferromagnetic material.

Owing to the provision of the small quantity of ferromagnetic material, for example iron powder, the desired check can be easily carried out, since a local incompleteness of the filling results in a satisfactorily measurable change in the magnetic properties.

A quantity of about 5% of ferromagnetic material in the filling is preferred, since on the one hand this provides an adequate check of the completeness of the filling and on the other hand any separating of the mixture does not yet bring about troublesome differences in the composition of the melted metal. In accordance with the requirements with respect to the uniformity of this composition the content of ferromagnetic material may be raised to about 20% by weight of the filling.

A composite wire according to the invention may be composed of a mild steel casing and a powdery filling consisting of a non-magnetic alloy mixed with iron powder in such a ratio that the wire consists of:

50% of powdery steel alloy with 40% of Cr and 20% of Ni,
5% of iron powder,
45% of mild steel casing.

When the filling is complete and no separating of the mixture has taken place during manufacture, this composition corresponds with that of an alloy of 20% of chromium, 10% of nickel and otherwise iron.

If it is assumed that the mixture of the filling separates to an extent lying between 48% of the alloy+7% of Fe and 52% of the alloy+3% of Fe, it can be calculated, leaving the differences in specific weights of the alloy powder and the iron powder out of consideration for the sake of simplicity, that the supposed, very extreme, practically scarcely expectable separating of the mixture results in alloys having 19.2% of Cr and 9.6% of Ni and 20.8% of Cr and 10.4% of Ni respectively, instead of the nominal composition of 20% of Cr and 10% of Ni. Even this extreme separating of the mixture therefore does not give rise to alarming deviations from the nominal composition. Moreover, the magnetic check does not only respond to any incompleteness of the filling but also to such strong separating of the mixture.

In a similar manner wires can be manufactured with a gross composition corresponding to molybdenum-containing chromium-nickel steels and austenitic manganese steels, for example a steel having 13% of manganese. The filling must always consist of a single non-magnetic metal mixed with the low percentage of magnetic material required for carrying out the magnetic check.

What is claimed is:
1. A composite alloy steel welding wire, said wire consisting of a tubular casing of a steel selected from the group consisting of mild steel and low alloy steel and a filling of a powdery material, said filling consisting of a non-magnetic metallic substance capable of forming an alloy with the steel casing in an amount of less than 100% but at least 80% by weight of the filling and for the remainder of the filling a ferromagnetic material.

2. The welding wire of claim 1 wherein about 5% by weight of the filling consists of the ferromagnetic material.

References Cited

UNITED STATES PATENTS

| | | | |
|---|---|---|---|
| 1,893,160 | 1/1933 | Clarke | 29—191.2 |
| 2,219,462 | 10/1940 | Wissler | 29—191.2 |
| 2,612,583 | 9/1952 | Bernard | 29—191.6 |

DAVID L. RECK, *Primary Examiner.*

RICHARD O. DEAN, *Examiner.*